Figure 1:
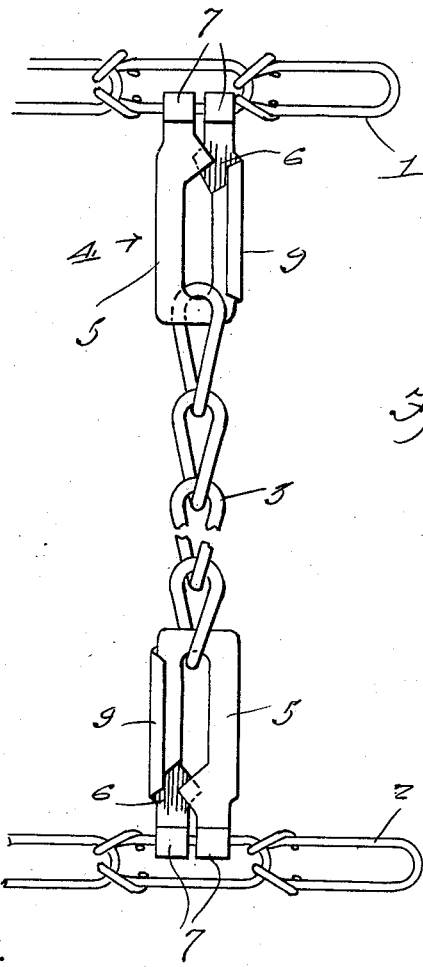

Feb. 25, 1930.　　　G. D. THOMAS　　　1,748,253
ANTISKID DEVICE
Filed Jan. 27, 1928

Inventor
G. D. Thomas

By Clarence A. O'Brien
Attorney

Patented Feb. 25, 1930

1,748,253

UNITED STATES PATENT OFFICE

GEORGE D. THOMAS, OF DUQUESNE, PENNSYLVANIA

ANTISKID DEVICE

Application filed January 27, 1928. Serial No. 249,888.

The present invention relates to improvements in anti-skid chains for automobile tires and has for its principal object to provide a means for detachably connecting the ends of the cross chains to the respective side chains whereby a broken or worn out cross chain may be replaced whenever necessary.

One of the important objects of the present invention resides in the provision of an anti-skid arrangement of the above mentioned character wherein the connecting means between the ends of the cross chain and the respective side chains can be readily and easily actuated for assembly or disassembly, means being associated with said connecting means to positively secure the same in its assembled relation so that the cross chain cannot be accidentally disengaged from the side chains.
A still further object is to provide an anti-skid device of the above mentioned character, which is simple in construction, inexpensive, strong and durable and further well adapted to the purpose for which it is designed.

Other objects and advantages of the invention will become apparent during the course of the following description when taken in connection with the accompanying drawing.

In the accompanying drawing wherein like reference characters indicate corresponding parts throughout the several views:

Figure 1 is a top plan view of a cross chain showing my improved connecting means associated with the outer end thereof and operatively connected with the adjacent links of the respective side chains.

Figure 2:
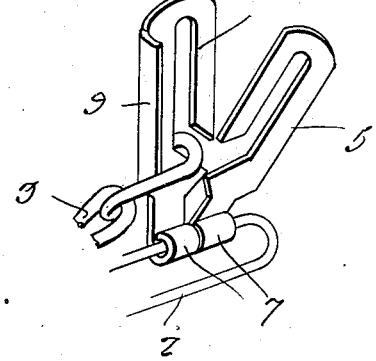
Figure 3:
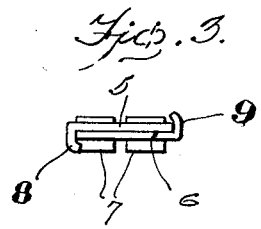

Figure 2 is a detail perspective view of one of the separable links showing the same in the act of being separated, and Figure 3 is an inner end elevation of the separable link showing the complementary hooks disposed in their assembled relation.
In the drawing wherein for the purpose of illustration is shown the preferred embodiment of my invention, the numerals 1 and 2 designate a pair of parallel spaced side chains that are adapted to extend circumferentially around an automobile tire in the manner well known in the art. These side chains are usually connected together by a series of transversely extending tread engaging cross chains arranged at spaced intervals, and in the present instance, I have illustrated a single cross chain and the same is designated by the numeral 3. This cross chain consists of a plurality of interconnected links and is of such length as to extend over the tread portion of the tire, but the endmost links of the cross chains 3 are spaced from the respective side chains.

For the purpose of detachably securing the ends of the cross chain 3 to the respective side chains, I provide the separable fasteners or links designated generally by the numeral 4, and this fastener or link comprises a pair of complementary flat hooks 5 and 6 respectively. The outer free end of the longer arm of each hook member is formed with a knuckle designated by the numeral 7, and the knuckles of the complementary hooks are disposed in alinement with each other and adapted to receive or engage with the innermost side of the adjacent links of the respective side chains whereby said hook members are adapted for slidable and swinging movement on the particular links as will be presently described.

A laterally disposed lip 8 is formed on the outer longitudinal edge portion of the hook 5 while a similar lip 9 extends laterally from the outer edge of the complementary hook 6. These lips are disposed in opposite directions and the free edges thereof are slightly bent inwardly and cooperate with the adjacent edges of the opposite hooks to secure said hook members in overlapping relation whereby each of the separable hooks or fasteners 4 will provide a link for affording a positive connection between the outer end of the cross chain 3 and the respective side chains 1 and 2 and these spring lips 8 and 9 will prevent the complementary hooks from becoming disengaged with respect to each other, but it is of course to be understood that the lips are of such construction as to permit the hooks to be forcibly separated by sliding one of the hook members along the link of the particular side chain to which its knuckle is engaged.

In Figure 2 of the drawing, there is more clearly illustrated the manner in which the complementary hooks of each of the separable fasteners is separated. After the hook sections have been moved apart a sufficient distance to permit the lateral swinging movement of the hooks, the hooks then assume the position shown in Figure 2 so that the endmost link of the cross chain can be readily disengaged from its particular connecting link in order that a broken or worn out cross chain may be removed and replaced with a new one.

The provision of an anti-skid arrangement of this character will save considerable expense and will obviate the necessity of having to entirely discard the anti-skid chain should one of the cross chains become broken or worn out. The simplicity of the link construction forming a salient part of the present invention enables the same to be readily and easily actuated and when properly assembled will provide a positive and efficient means for properly securing the ends of the cross chain to the respective side chains and there will be no possibility of the hooks of the fasteners or links becoming separated while the anti-skid chain is in use. Also a separable fastener of this character can be manufactured at a very low cost and the same will be strong and durable.

While I have shown the preferred embodiment of my invention it is to be understood that minor changes may be made therein without departing from the spirit of the invention and the scope of the appended claims.

Having thus described the invention, what I claim as new is:—

1. A fastener for joining chains comprising, a pair of flat complementary hooks adapted for disposition in overlapping relation to form a link with their hooked ends disposed in opposite directions; the opposite ends of said hooks each being provided with a knuckle for pivotal engagement on a chain link, the axes of the said knuckles extending in substantially the same direction as the planes of the opposite faces of the hooks, and laterally disposed spring lips formed on the outer edges of the hooks and disposed in opposite directions for locking engagement each with the adjacent edge of the other hook to secure the same in their assembled chain forming relation.

2. In combination, a chain link and a fastener mounted thereon, said fastener comprising a pair of flat complementary hook members adapted for overlapping disposition to form a link, with their hooked ends disposed in opposite directions, the opposite end of each hook being provided with a knuckle for slidable and pivotal engagement on one side portion of the link, whereby said hooks may be separated with respect to each other; and laterally disposed spring lips disposed on the outer edges of the hooks and disposed in opposite directions for securing engagement with the adjacent edges of the hook members to prevent independent pivotal movement of the link members on the link.

In testimony whereof I affix my signature.

GEORGE D. THOMAS.